(12) United States Patent
Nakagawa

(10) Patent No.: US 6,697,286 B2
(45) Date of Patent: Feb. 24, 2004

(54) DRIVER CIRCUIT

(75) Inventor: Masashi Nakagawa, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 10/235,819

(22) Filed: Sep. 6, 2002

(65) Prior Publication Data

US 2003/0072186 A1 Apr. 17, 2003

(30) Foreign Application Priority Data

Sep. 7, 2001 (JP) ........................ 2001-272778

(51) Int. Cl.[7] ................................. G11C 7/00
(52) U.S. Cl. ........................ 365/189.05; 365/230.06; 327/108; 326/30
(58) Field of Search ................ 365/189.05, 189.11, 365/230.06; 327/108; 326/30

(56) References Cited

U.S. PATENT DOCUMENTS 6,072,729 A * 6/2000 Casper .................. 365/189.05

2001/0035768 A1 * 11/2001 Garlepp et al. ............... 326/30

FOREIGN PATENT DOCUMENTS

JP 2000-22516 1/2000

* cited by examiner

Primary Examiner—Richard Elms
Assistant Examiner—Nam Nguyen
(74) Attorney, Agent, or Firm—Young & Thompson

(57) ABSTRACT

A driver circuit for outputting to a transmission line a differential signal occurring between a first output terminal and a second output terminal as transmit data, includes: a first circuit for outputting, when in-phase data is input at a first input terminal thereof, an output signal having a logic level which corresponds to the data to the first output terminal via a resistor; a second circuit for outputting, when opposite-phase data is input to a second input terminal thereof, an output signal having a logic level which corresponds to the data to the second output terminal via a resistor; and an adjusting resistor connected between the fist output terminal and the second output terminal. The resistor is connected between the first and second output terminals and the power supply or the ground respectively, so that an offset voltage of the differential signal can be set at a desired value.

16 Claims, 5 Drawing Sheets

DRIVER CIRCUIT

BACKGROUND OF THE INVENTION

1. Field of the Invention

The present invention relates to a driver circuit for outputting transmit data the transmission line as a differential signal.

The present application claims priority of Japanese Patent Application No.2001-272778 filed on Sept. 7, 2001, which is hereby incorporated by reference.

2. Description of the Related Art

In a trunk communications system or a like, for example, it is sometimes necessary to use a transmission line in order to interconnect functional blocks arranged separately from each other so that they can transfer data to each other.

In such a case, in order to output transmit data to the transmission line in a format of a differential signal, a driver circuit is used to match impedance of each of the blocks with that of the transmission line and also to set a signal level at a predetermined value.

FIG. 5 shows an example of the configuration of a conventional driver circuit 100, which is disclosed in Japanese Patent Application Laid-open No. 2000-22516.

As shown in FIG. 5, the conventional driver circuit 100 includes P-type MOS (Metal Oxide Semiconductor) (hereinafter referred to as PMOS) transistors 101A and 101B, N-type MOS (hereinafter referred to as NMOS) transistors 102A and 102B, and resistors 103 to 107.

In the driver circuit 100 shown in FIG. 5, the PMOS transistor 101A, the resistors 103 and 104, and the NMOS transistor 102A and the PMOS transistor 101B, the resistors 105 and 106, and the NMOS transistor 102B are connected in series between a power supply VDD and a ground (GND) respectively in such a configuration that the resistor 107 is connected between a midpoint between the resistor 103 and resistor 104, and a midpoint between the resistor 105 and resistor 106. Furthermore, the respective gates of the PMOS transistor 101A and NMOS transistor 102A are connected in parallel to an input terminal 109 and the respective gates of the PMOS transistor 101B and NMOS transistor 102B are connected in parallel to an input terminal 110, while the midpoint between the resistor 103 and resistor 104 is connected to an output terminal 111 and the midpoint between the resistor 105 and resistor 106 is connected to an output terminal 112.

In the driver circuit 100 of FIG. 5, the PMOS transistor 101A, the resistors 103 and 104, and the NMOS transistor 102A make up a first push-pull circuit, while the PMOS transistor 101B, the resistors 105 and 106, and the NMOS transistor 102B make up a second push-pull circuit.

In this configuration, suppose that transmit data including in-phase data is applied to the input terminal 109 of the first push-pull circuit and opposite-phase data obtained by inverting the transmit data is applied to the input terminal 110 of the second push-pull circuit.

When the in-phase data applied to the first input terminal 109 is LOW in level and the opposite-phase data applied to the second input terminal 110 is HIGH in level, only the PMOS transistor 101A and NMOS transistor 102B are turned ON, turning the PMOS transistor 101B and NMOS transistor 102A OFF. Furthermore, when the in-phase data input to the input terminal 109 is HIGH in level and the opposite-phase data applied to the input terminal 110 is LOW in level, only the PMOS transistor 101B and NMOS transistor 102A are turned ON, turning the PMOS transistor 101A and NMOS transistor 102B OFF.

Accordingly, at the output terminal 111 of the first push-pull circuit an opposite phase output signal with the transmit data occurs, while at the output terminal 112 of the second push-pull circuit an in-phase output signal with the transmit data occurs, so that the output signal including a differential signal synchronized with the transmit data with reference to an electric potential of a virtual midpoint C of the resistor 107 occurs between the output terminals 111 and 112.

Supposing that the resistors 103 to 106 all have an equal resistance value Ra and the resistor 107 has a resistance value 2Rs and also that the input opposite phase data and input in-phase data have an amplitude large enough to permit the PMOS transistors 101A, 101B and NMOS transistors 102A, 102B to operate in their respective saturated regions always, then internal resistances of each of the transistors 101A, 101B, 102A and 102B in operating phase is negligibly small with respect to the resistance value Ra, so that differential output impedance between the output terminals 111 and 112 when the HIGH level is output is the same as that when the LOW level is output, thus leaving the output level as being dependent on a relative magnitude relationship between the resistance value Ra and resistance value Rs.

Furthermore, the output terminals 111 and 112 of the driver circuit 100 are connected to each one wire of a two-wire type of transmission line 120 (hereinafter may referred simply to as transmission line 120), between ends of which resistors 121 and 122 are connected in series each having a resistance value RT, a midpoint of which is grounded through a capacitor 123 in an alternating-current operating phase, so that the two wires of the transmission line 120 are connected with the differential output impedance of the driver circuit 100 between the output terminals 111 and 112 on a transmission side and, on a reception side, connected with the respective resistors 121 and 122 and also to a reception circuit (not shown) having high input impedance.

Since the differential output impedance of the driver circuit 100 between the output terminals 111 and 112 is determined by a synthetic resistance value of a parallel connection of two kinds of resistors which is expressed by resistance values Ra and Rs, the resistor 107 can be used as an adjusting resistor so that the differential output impedance may be equal to characteristic impedance of the transmission line 120 and also that the resistance value RT may be equal to the characteristic impedance of the transmission line 120, thus holding both the respective transmission side and the reception side of the transmission line 120 in a matched state.

Thus, in the driver circuit 100, since the resistors (loads) 103 to 106 of the two push-pull circuits all have the same resistance value, the output impedance remains constant regardless of whether the differential output is HIGH or LOW in level, while a ratio between the resistance value Ra and resistance value RS can be changed to arbitrarily set an output amplitude to the transmission line 120 in a condition where the output impedance value is so held that the driver circuit 100 may be matched with the transmission line 120.

It is thus possible, with the driver circuit 100, to maintain a matched state with the transmission line 120 and also to decrease an output signal level of the transmission line 120 in order to prevent inductive interference against an external device (especially, other transmission lines), thus securing stable operations in a case where a number of transmission lines are established among the functional blocks.

According to the conventional driver circuit 100 shown in FIG. 5, in both the two push-pull circuits connected between the power supply VDD and the ground GND, the two resistors having the same resistance value are connected between the power-supply side PMOS transistor 101A (101B) and the ground side NMOS transistor 102A (102B) of each of these two push-pull circuits and have their midpoints each connected with a resistor in such a configuration that the two ends of this resistor are to be connected with the transmission line 120 and also that the gates of the PMOS and NMOS transistors of these two push-pull circuits are connected in parallel with each other to receive in-phase data and opposite-phase data respectively, so that it is possible to hold the output impedance constant regardless of whether the differential output is HIGH or LOW in level and so to arbitrarily set the output amplitude of the driver circuit 100 with the output impedance as holding the transmission line 120 in a matched state.

In this conventional driver circuit 100 of FIG. 5, however, voltage at the virtual midpoint C of the resistor 107 connected between the output terminals 111 and 112, that is, an offset level of the output signal is always fixed at an intermediate level between a power supply voltage and a ground voltage and so cannot be set at an arbitrary value.

Nevertheless, in a typical driver circuit, depending on the operating conditions of a reception circuit connected at reception terminals of a transmission line, an offset level of a signal transferred through the transmission line may sometimes desired to be set at a value different from half a power supply voltage, in which case, however, the conventional driver circuit 100 of FIG. 5 cannot conduct such control as to do so, which is a problem.

SUMMARY OF THE INVENTION

In view of the above, it is an object of the present invention to provide a novel driver circuit for outputting transmit data, in a format of a differential signal, to a transmission line which can set an output level at a predetermined value while matching an output impedance with characteristic impedance of the transmission line and also to set at an arbitrary value of an offset level of an output signal sent through the transmission line.

According to a first aspect of the present invention, there is provided a driver circuit for outputting to a transmission line a differential signal occurring between a first output terminal and a second output terminal as transmit data, including:

a first circuit for outputting, when in-phase data is input to a first input terminal thereof, an output signal having a logic level which corresponds to the in-phase data to the first output terminal via resistors;

a second circuit for outputting, when opposite-phase data is input to a second input terminal thereof, an output signal having a logic level which corresponds to the opposite-phase data to the second output terminal via resistors; and an adjusting resistor connected between the first output terminal and the second output terminal, wherein connected is a resistor between the first output terminal and a power supply or a ground, a resistor between the second output terminal and the power supply or the ground, so that an offset voltage of the differential signal can be set at a desired value.

In the foregoing first aspect, a preferable mode is one wherein each of resistors making up the driver circuit is formed on a same substrate by using a same process.

According to a second aspect of the present invention, there is provided a driver circuit including:

a first circuit in which a first switching device (for example a PMOS transistor) that is turned ON when in-phase data is input thereto at a LOW level and a first resistor are connected in series with each other between a power supply and a first output terminal and also in which a second resistor and a second switching device (for example an NMOS transistor) that is turned ON when the in-phase data is input thereto at a HIGH level are connected in series with each other between the first output terminal and a ground;

a second circuit in which a third switching device (for example a PMOS transistor) that is turned ON when opposite-phase data is input thereto at a LOW level and a third resistor are connected in series with each other between the power supply and a second output terminal and also in which a fourth resistor and a fourth switching device (for example an NMOS transistor) that is turned ON when the opposite-phase data is input thereto at a HIGH level are connected in series with each other between the second output terminal and the ground; and a fifth resistor connected between the first output terminal and the second output terminal, wherein:
the first through fourth resistors have an equal resistance value;
a sixth resistor is connected between the first output terminal and the power supply; and
a seventh resistor is connected between the second output terminal and the power supply.

In the foregoing second aspect, a preferable mode is one wherein the sixth resistor and the seventh resistor have an equal resistance value.

Another preferable mode is one wherein a turn-ON resistance value of the first through fourth switching devices is negligible with respect to a resistance value of the first through fourth resistors respectively.

Still another preferable mode is one wherein each of switching devices making up the driver circuit is formed on a same substrate by using a same process.

According to a third aspect of the present invention, there is provided a driver circuit including:

a first circuit in which a first switching device (for example a PMOS transistor) that is turned ON when in-phase data is input thereto at a LOW level and a first resistor are connected in series with each other between a power supply and a first output terminal and also in which a second resistor and a second switching device (for example an NMOS transistor) that is turned ON when the in-phase data is input thereto at a HIGH level are connected in series with each other between the first output terminal and a ground;

a second circuit in which a third switching device (for example a PMOS transistor) that is turned ON when opposite-phase data is input thereto at a LOW level and a third resistor are connected in series with each other between the power supply and a second output terminal and also in which a fourth resistor and a fourth switching device (for example an NMOS transistor) that is turned ON when the opposite-phase data is input thereto at a HIGH level are connected in series with each other between the second output terminal and the ground; and a fifth resistor connected between the first output terminal and the second output terminal, wherein:

the first through fourth resistors have an equal resistance value;
a sixth resistor is connected between the first output terminal and the ground; and
a seventh resistor is connected between the second output terminal and the ground.

In the foregoing third aspect, a preferable mode is one wherein the sixth resistor and the seventh resistor have an equal resistance value.

Another preferable mode is one wherein a turn-ON resistance value of the first through fourth switching devices is negligible with respect to a resistance value of the first through fourth resistors respectively.

According to a fourth aspect of the present invention, there is provided a driver circuit including:
a first circuit in which a first PMOS transistor that is turned ON when in-phase data is input thereto at a LOW level and a first resistor are connected in series with each other between a power supply and a first output terminal and also in which a second resistor and a first NMOS transistor that is turned ON when the in-phase data is input thereto at a HIGH level are connected in series with each other between the first output terminal and a ground;
a second circuit in which a second PMOS transistor that is turned ON when opposite-phase data is input thereto at a LOW level and a third resistor are connected in series with each other between the power supply and a second output terminal and also in which a fourth resistor and a second NMOS transistor that is turned ON when the opposite-phase data is input thereto at a HIGH level are connected in series with each other between the second output terminal and the ground; and
a fifth resistor connected between the first output terminal and the second output terminal, wherein:
the first through fourth resistors have an equal resistance value;
a sixth resistor is connected between the first output terminal and the power supply; and
a seventh resistor is connected between the second output terminal and the power supply.

According to a fifth aspect of the present invention, there is provided a driver circuit including:
a first circuit in which a first PMOS transistor that is turned ON when in-phase data is input thereto at a LOW level and a first resistor are connected in series with each other between a power supply and a first output terminal and also in which a second resistor and a first NMOS transistor that is turned ON when the in-phase data is input thereto at a HIGH level are connected in series with each other between the first output terminal and a ground;
a second circuit in which a second PMOS transistor that is turned ON when opposite-phase data is input thereto at a LOW level and a third resistor are connected in series with each other between the power supply and a second output terminal and also in which a fourth resistor and a second NMOS transistor that is turned ON when the opposite-phase data is input thereto at a HIGH level are connected in series with each other between the second output terminal and the ground; and
a fifth resistor connected between the first output terminal and the second output terminal, wherein:
the first through fourth resistors have an equal resistance value;
a sixth resistor is connected between the first output terminal and the ground; and
a seventh resistor is connected between the second output terminal and the ground.

With the above configurations, the output impedance remains constant regardless of whether a differential output between the output terminals is HIGH or LOW in level, so that an output amplitude to a transmission line can be set arbitrarily in a condition where an output impedance value is so held that the driver circuit may be matched with the transmission line and also an output signal offset level can be set at a value other than half of the power supply voltage. Further, even with variation of manufacture, the offset level can be held constant.

BRIEF DESCRIPTION OF THE DRAWINGS

The above objects, advantages, and features of the present invention will be more apparent from the following description taken in conjunction with the accompanying drawings, in which.

DESCRIPTION OF THE PREFERRED EMBODIMENTS

Best mode of carrying out the present invention will be described in further detail using various embodiments with reference to the accompanying drawings.

First Embodiment

Figure 1:
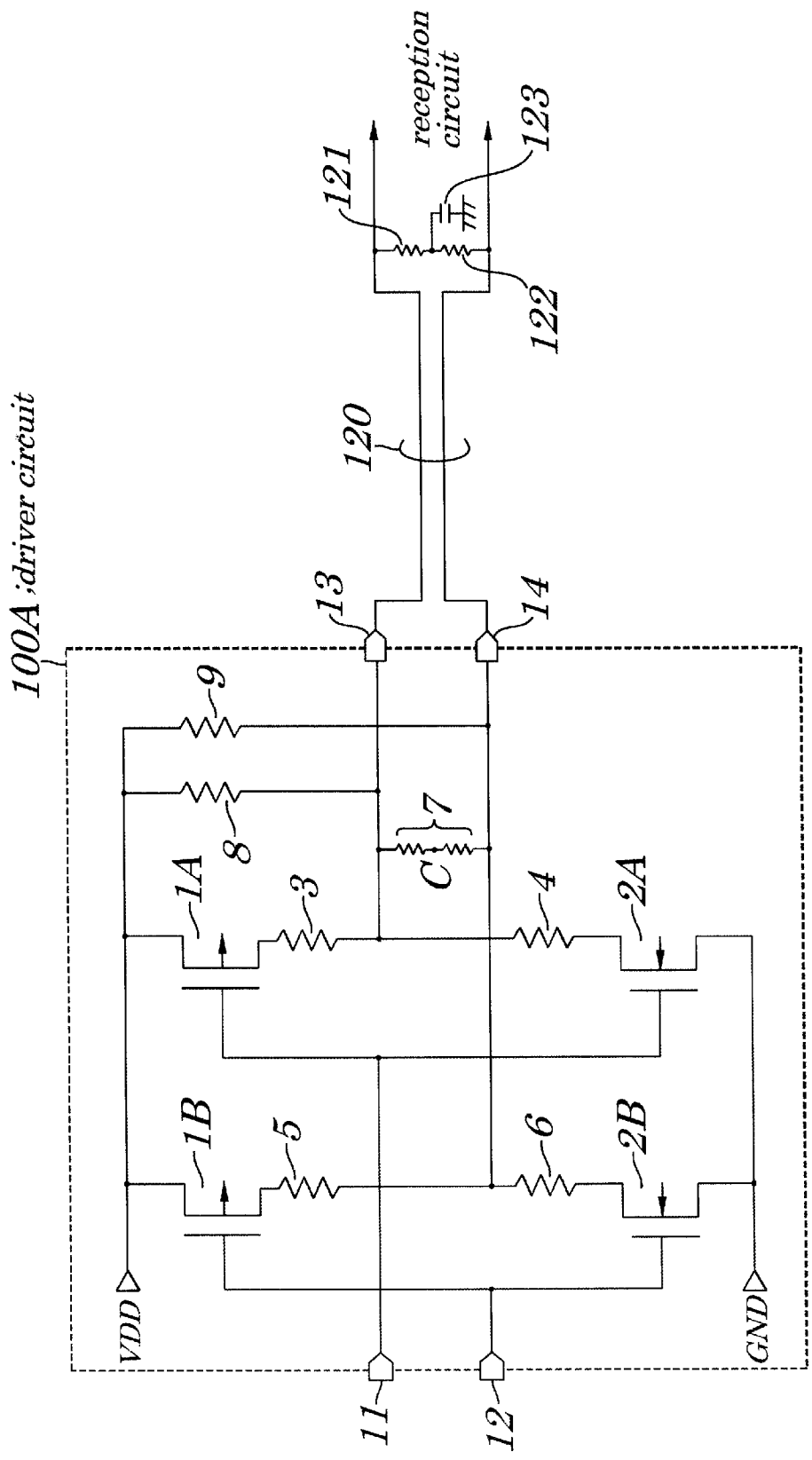
FIG. 1 is a circuit diagram for showing a configuration of a driver circuit according to a first embodiment of the present invention.
Figure 2:
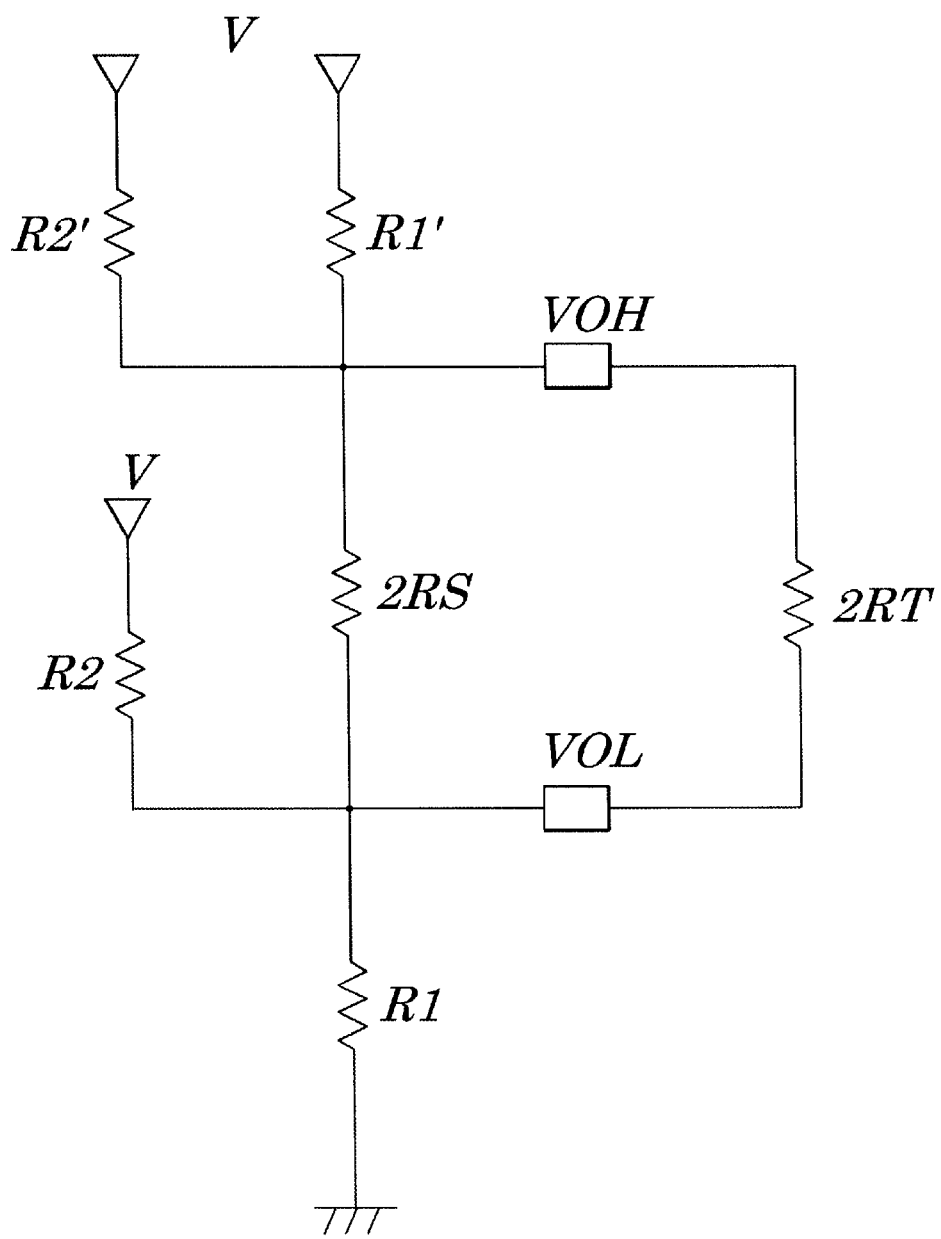
FIG. 2 is a circuit diagram for showing an equivalent circuit for calculation of an offset level in the driver circuit of the first embodiment.

FIG. 1 is a circuit diagram for showing a configuration of a driver circuit 100A according to a first embodiment of the present invention, and FIG. 2 is a circuit diagram for showing an equivalent circuit for calculation of an offset level in the driver circuit 100A of the first embodiment.

As shown in FIG. 1, the driver circuit 100A includes PMOS transistors 1A and 1B, NMOS transistors 2A and 2B, and resistors 3 to 9.

In the driver circuit 100A of FIG. 1, the PMOS transistor 1A, the resistors 3 and 4, and the NMOS transistor 2A and the PMOS transistor 1B, the resistors 5 and 6, and the NMOS transistor 2B are each connected in series between a power supply VDD and a ground GND in such a configuration that the resistor 7 is connected between an interconnection of the resistors 3 and 4 and that of the resistors 5 and 6. Furthermore, gates of the PMOS transistor 1A and the NMOS transistor 2A are connected in parallel with each other at a first input terminal 11 and those of the PMOS transistor 1B and the NMOS transistor 2B are connected in parallel with each other at a second input terminal 12 in such a configuration that an interconnection of the resistors 3 and 4 is connected to a first output terminal 13 and that of the resistors 5 and 6 is connected to a second output terminal 14. Furthermore, the first output terminal 13 is connected to the power supply VDD via the resistor 8 and the second output terminal 14, to the power supply VDD via the resistor 9.

The following will describe the operations of the driver circuit 100A of the present embodiment with reference to FIG. 1.

In the driver circuit 100A shown in FIG. 1, the PMOS transistor 1A, the resistors 3 and 4, and the NMOS transistor 2A make up a first push-pull circuit, while the PMOS transistor 1B, the resistors 5 and 6, and the NMOS transistor 2B make up a second push-pull circuit.

Now, suppose that transmit data including in-phase data is applied to the first second input terminal 11 of the first push-pull circuit and opposite-phase data obtained by inverting the transmit data is applied to the input terminal 12 of the second push-pull circuit.

If the in-phase data applied at the first input terminal 11 is LOW in level and the opposite-phase data applied at the second input terminal 12 is HIGH in level, only the PMOS transistor 1A and the NMOS transistor 2B are turned ON, turning the PMOS transistor 1B and the NMOS transistor 2A OFF. If the in-phase data applied at the first input terminal 11 is HIGH in level and the opposite-phase data applied at the second input terminal 12 is LOW in level, on the other hand, only the PMOS transistor 1B and the NMOS transistor 2A are turned ON, turning the PMOS transistor 1A and the NMOS transistor 2B OFF.

Then, an opposite phase output signal opposite with the transmit data occurs at the first output terminal 13 of the first push-pull circuit, while an in-phase output signal with the transmit data occurs at the second output terminal 14 of the second push-pull circuit, so that an output signal including a differential signal synchronized with the transmit data is generated between the first and second output terminals 13 and 14 with reference to a potential at a virtual midpoint C of the resistor 7.

Supposing that the resistors 3 to 6 all have the same resistance value RA and the resistor 7 has a resistance value 2RS and also that amplitudes of incoming in-phase data and opposite-phase data are both large enough to permit the PMOS transistor 1A, 1B and NMOS transistors 2A, 2B all to operate in a saturated region always, internal resistance of each of the transistors 1A, 1B, 2A and 2B in operating phase is negligibly small as compared to the resistance RA, so that an impedance of the differential output between the first and second output terminals 13 and 14 remains constant regardless of whether the output is HIGH or LOW in level and also the level of output is roughly determined by a relative relationship in magnitude between the resistance values RA and RS.

The first and second output terminals 13 and 14 of the driver circuit 100A are connected to each one of a two-wire type of transmission line 120 such as, for example, a twisted pair-wire line, between ends of which resistors 121 and 122 are connected in series each having a resistance value RT, an interconnection of which is grounded through a capacitor 123 in an alternating-current operating phase, so that the two wires of the transmission line 120 are connected with the differential output impedance of the driver circuit 100A between the first and second output terminals 13 and 14 on a transmission side and, on a reception side, connected with the respective resistors 121 and 122 and also to a reception circuit (not shown) having high input impedance.

Since the differential output impedance of the driver circuit 100A between the first and second output terminals 13 and 14 is determined by a synthetic resistance value of a parallel connection of three kinds of resistors, which is expressed by resistance values RA, RB and RS, the resistor 7 can be used as an adjusting resistor so that the differential output impedance may be equal to characteristic impedance of the transmission line 120 and also that the resistance value RT may be equal to the characteristic impedance of the transmission line 120, thus holding the respective transmission side and the reception side of the transmission line 120 in a matched state.

Furthermore, in the driver circuit 100A of the present embodiment, voltage of the power supply VDD is applied via the resistor 8 to the first output terminal 13 and also to the second output terminal 14 via the resistor 9, so that the virtual midpoint C of the resistor 7 connected between the first and second output terminals 13 and 14, that is, an offset level of the output signal is pulled up toward voltage of the power supply VDD and so can be set at a value higher than half of voltage of the power supply VDD.

In this case, an offset level VOS can be obtained as follows using an equivalent circuit shown in FIG. 2 supposing that a voltage at the first output terminal 13 is VOH, a voltage at the second output terminal 14 is VOL, and a voltage difference between the first and second output terminals 13 and 14 is VOD:

$$VOS = \frac{VOL + VOH}{2} \quad (1)$$

where $$VOL = \frac{V - \frac{R1}{R1+R2}V}{\frac{R1 \cdot R2}{R1+R2} + \frac{R1' \cdot R2'}{R1'+R2'} + \frac{2RS \cdot RT}{RS+RT}} \cdot \frac{R1 \cdot R2}{R1+R2} + \frac{R1}{R1+R2}V$$

$$VOH = VOL + VOD$$

$$VOD = \frac{V - \frac{R1}{R1+R2}V}{\frac{R1 \cdot R2}{R1+R2} + \frac{R1' \cdot R2'}{R1'+R2'} + \frac{2RS \cdot RT}{RS+RT}} \cdot \frac{2RS \cdot RT}{RS+RT}$$

Therefore, the following equation is given:

$$VOS = \qquad (2)$$
$$\left(1 + \frac{R1}{R1+R2}\right) \cdot \frac{V}{2} - \frac{\Delta R}{\frac{R1 \cdot R2}{R1+R2} + \frac{RS \cdot RT}{RS+RT} + \frac{\Delta R}{2}} \cdot \left(1 - \frac{R1}{R1+R2}\right) \cdot \frac{V}{4}$$

where $$\Delta R = \frac{R1 \cdot R2}{R1+R2} - \frac{R1' \cdot R2'}{R1'+R2'} \quad (3)$$

Assuming here that

R1=RN+RA≒RA
R2=RB
R1'=RP+RA≒RA
R2'=RB

RP=turn-ON resistance of PMOS transistor; and
RN=turn-ON resistance of NMOS transistor, then, the following equation is given because ΔR=0:

$$VOS \approx \left(1 + \frac{RA}{RA+RB}\right) \cdot \frac{V}{2} \qquad (4)$$

Thus, in the driver circuit 100A, since the resistors (loads) 3 to 6 of the two push-pull circuits all have the same resistance value, the output impedance remains constant regardless of whether the differential output is HIGH or LOW in level, while a ratio between the resistance values RA and RS can be changed to arbitrarily set an output amplitude to the transmission line 120 in a condition where the output impedance value is so held that the driver circuit 100A may be matched with the transmission line 120, so that it is possible to prevent inductive interference to an external device (especially, other transmission lines) by decreasing the level of an output signal sent through the transmission line 120 to stabilize the operations when a number of transmission lines are provided among the functional blocks and also, by pulling up potentials of both first and second output terminals 13, 14 to the power supply voltage through a resistor, to set an output signal offset level higher than half of the power supply voltage, thus generating such an output signal as to match the operating conditions of a reception circuit connected to a reception end of the transmission line 120.

In the driver circuit 100A according to the first embodiment shown in FIG. 1, an offset level of an output signal can be set higher than half of the power supply voltage to thereby generate such an output signal as to match the operating conditions of a reception circuit connected to the reception end of the transmission line 120.

Second Embodiment

Figure 3:
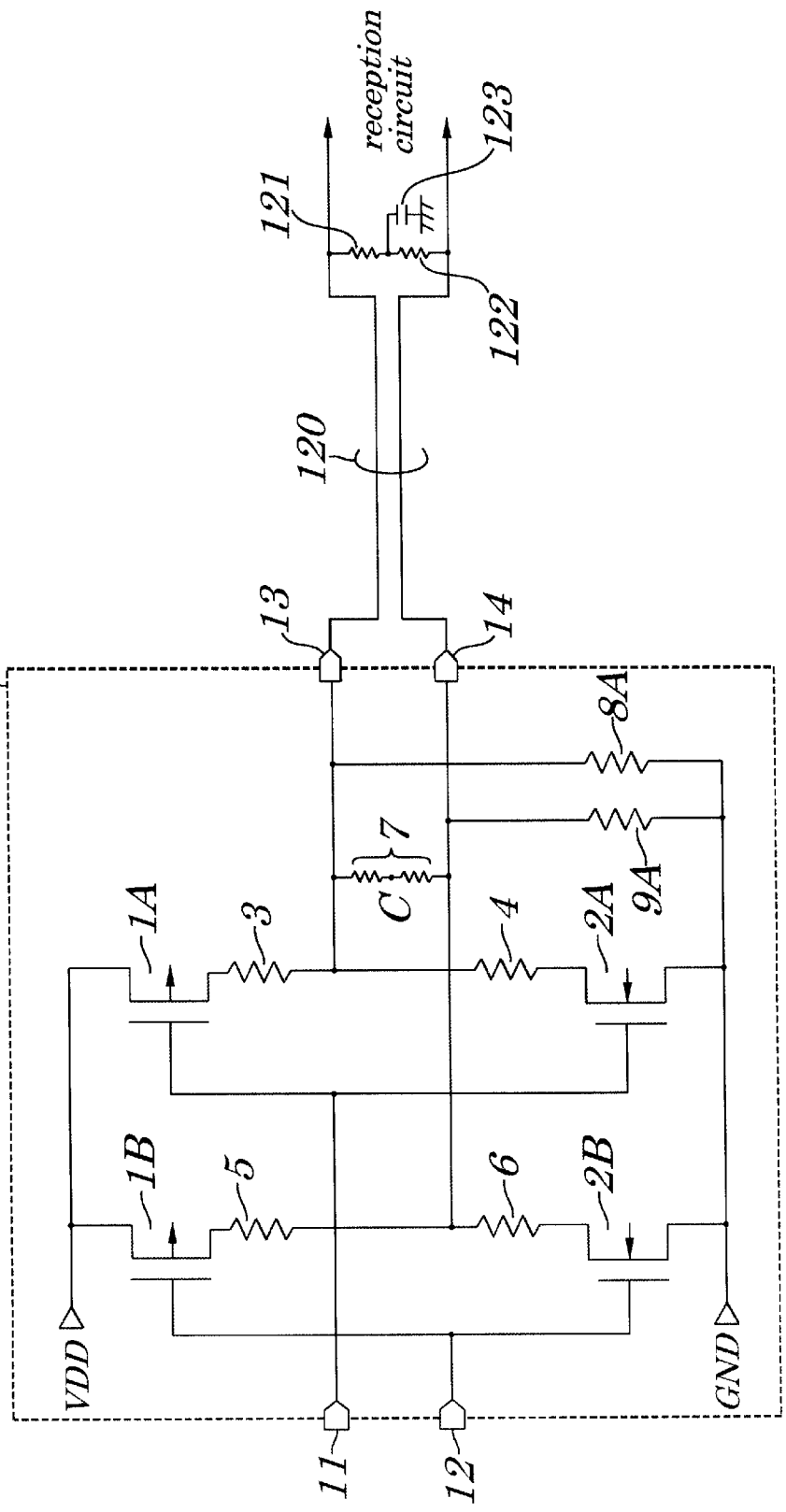
FIG. 3 is a circuit diagram for showing a driver circuit according to a second embodiment of the present invention.

FIG. 3 is a circuit diagram for showing a driver circuit 100B according to a second embodiment of the present invention.

As shown in FIG. 3, the driver circuit 100B according to the present embodiment includes PMOS transistors 1A and 1B, the NMOS transistors 2A and 2B, and resistors 3 to 7, 8A, and 9A.

In the driver circuit 100B shown in FIG. 3, the PMOS transistor 1A, the resistors 3 and 4, and the NMOS transistor 2A which make up a first push-pull circuit and the PMOS transistor 1B, the resistors 5 and 6, and the NMOS transistor 2B which make up a second push-pull circuit are connected in series between a power supply VDD and a ground GND respectively in such a configuration that the resistor 7 is connected between an interconnection of the resistor 3 and 4 and that of the resistors 5 and 6. Furthermore, gates of the PMOS transistor 1A and the NMOS transistor 2A are connected in parallel with each other at a first input terminal 11 and those of the PMOS transistor 1B and the NMOS transistor 2B are connected in parallel with each other at a second input terminal 12 in such a configuration that an interconnection of the resistors 3 and 4 is connected to a first output terminal 13 and that of the resistors 5 and 6 is connected to a second output terminal 14. Furthermore, the first output terminal 13 is connected to the GND via the resistor 8A and the second output terminal 14, to the GND via the resistor 9A.

The following will describe the operations of the driver circuit 100B of the present embodiment with reference to FIG. 3.

In the driver circuit 100B shown in FIG. 3, as in the case of the first embodiment shown in FIG. 1, since the resistors (loads) 3 to 6 of the first and second push-pull circuits all have the same resistance value RA, output impedance can be arranged to remain constant regardless of whether differential output is HIGH or LOW in level, while at the same time a ratio between the resistance values RA and RS in the case where the resistor 7 is supposed to have a resistance value 2RS can be changed to arbitrarily set an output amplitude to a transmission line 120 in a condition where the output impedance value is so held that the driver circuit 100B may be matched with the transmission line 120.

Note here that as in the case of the first embodiment, the differential output impedance of the driver circuit 100B of the present embodiment is determined by a synthetic resistance value of a parallel connection of three kinds of resistors, which is expressed by resistance values RA, RC, and RS, if the resistors 8A and 9A are supposed to have a resistance value RC and so can be made equal to characteristic impedance of the transmission line 120 by using the resistor 7 as an adjusting resistor.

In the driver circuit 100B, on the other hand, since the first and second output terminals 13 and 14 are grounded via the resistors 8A and 9A respectively, voltage at a virtual midpoint C of the resistor 7 connected between the first and second output terminals 13 and 14, that is, an offset level of the output signal is pulled down to GND level and so can be set lower than half of voltage of the power supply VDD.

As described above, with the driver circuit 100B of the present embodiment, the output impedance can remains at the same value irrespective of whether a differential output which occurs between the first and second output terminals 13 and 14 is HIGH or LOW in level, and also the output amplitude to a two-wire type of transmission line 120 can be arbitrarily set in a condition that the output impedance value is so held that it may be matched with the transmission line 120; accordingly, by decreasing an output signal level of the transmission line 120, it is possible to prevent inductive interference against an external device (especially, other transmission lines) to thereby stabilize operations when a number of transmission lines are established among the functional blocks and also, by pulling down potentials of both of the first and second output terminals 13 and 14 to the GND potential, to set an offset level of the output signal lower than half of voltage of the power supply VDD, thus generating an output signal which is matched with the operating conditions of a reception circuit connected to a reception end of the transmission line 120.

By the first and second embodiments shown in FIGS. 1 and 3 respectively, when the transmission line 120 is connected thereto, it is possible to set an output level at a predetermined value as matching the output impedance with he characteristics of the transmission line 120 and also to set at an arbitrary value the offset level of an output signal sent out through the transmission line 120; besides, a driver circuit of the present invention can be adapted to a case where the transmission line 120 includes of a pair of coaxial cables.

The following will describe an embodiment of a driver circuit that can be adapted to a transmission line including a pair of coaxial cables.

Third Embodiment

Figure 4:
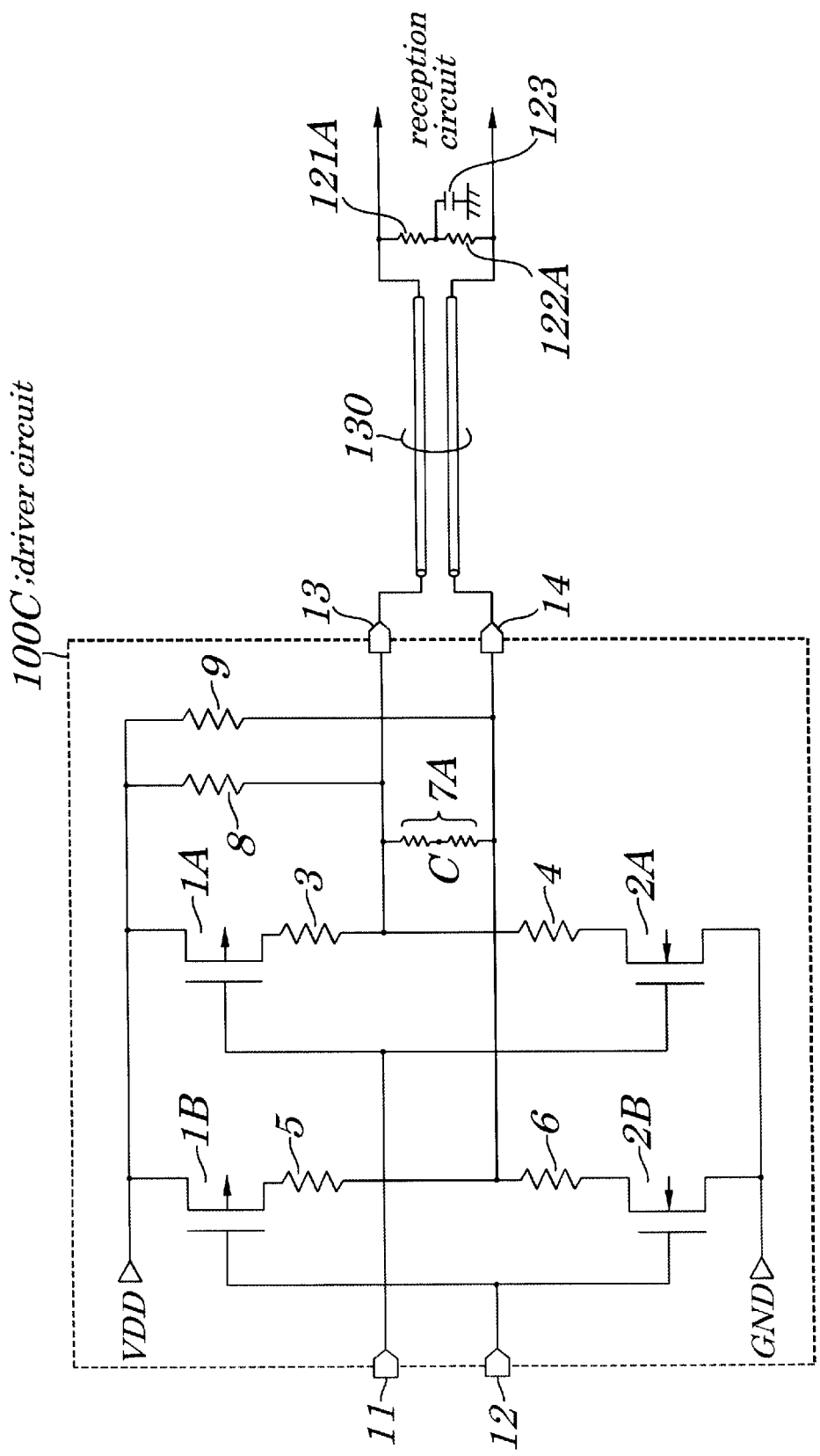
FIG. 4 is a circuit diagram for showing a driver circuit according to a third embodiment of the present invention.
Figure 5:
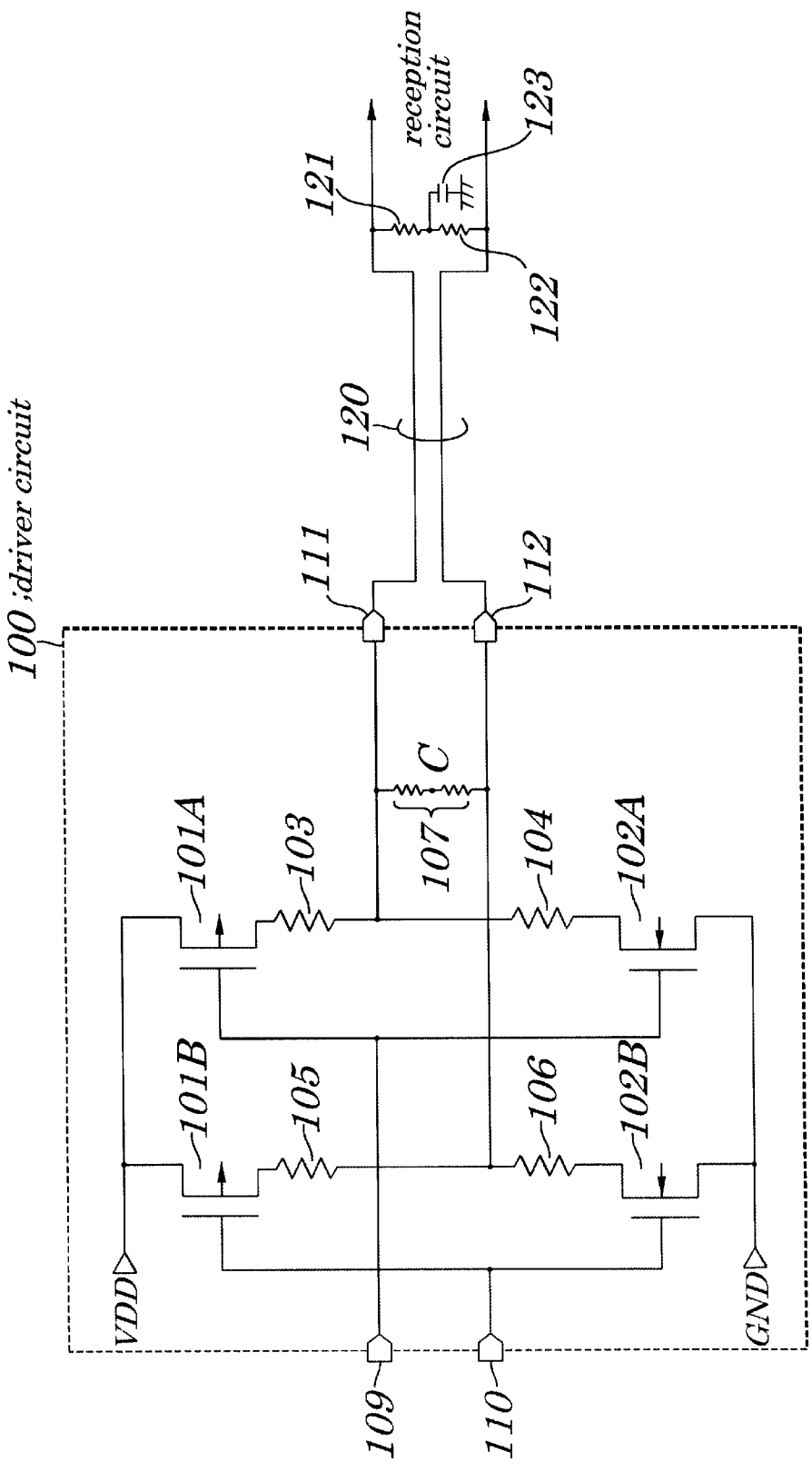
FIG. 5 is a circuit diagram for showing a configuration example of a conventional driver circuit.

FIG. 4 is a circuit diagram for showing a driver circuit 100C according to a third embodiment of the present invention.

As shown in FIG. 4, the driver circuit 100C according to the third embodiment includes PMOS transistors 1A and 1B, NMOS transistors 2A and 2B, and resistors 3 to 6, 7A, 8, and 9.

In the driver circuit 100C shown in FIG. 4, the PMOS transistor 1A, the resistors 3 and 4, and the NMOS transistor 2A and the PMOS transistor 1B, the resistors 5 and 6, and the NMOS transistor 2B are connected in series between a power supply VDD and a ground GND respectively in such a configuration that the resistor 7A is connected between an interconnection of the resistors 3 and 4 and that of the resistors 5 and 6. Furthermore, gates of the PMOS transistor 1A and the NMOS transistor 2A are connected in parallel with each other at a first input terminal 11 and those of the PMOS transistor 1B and the NMOS transistor 2B are connected in parallel with each other at a second input terminal 12 in such a configuration that an interconnection of the resistors 3 and 4 is connected to a first output terminal 13 and that of the resistors 5 and 6 is connected to a second output terminal 14. Furthermore, the first output terminal 13 is connected to the power supply VDD via the resistor 8 and the second output terminal 14, to the power supply VDD via the resistor 9.

The following will describe the operations of the driver circuit 100C of the present embodiment with reference to FIG. 4.

As in the case of the first embodiment shown in FIG. 1, in the driver circuit 100C of the present embodiment, an input signal including in-phase data and that including opposite-phase data are applied to generate an output signal including a differential signal in such a manner that an offset level of this output signal can be set arbitrarily.

The driver circuit 100C shown in FIG. 4 has first and second output terminals 13 and 14 connected with a pair of coaxial cables of a transmission line 130 and also has, on its output side, resistors 121A and 122A connected in series with each other having a same resistance value RTc, in such a configuration that an interconnection of these resistors 121A and 122A is grounded in an alternating current manner. The transmission line 130 has its cables connected, on a transmission side, with differential output impedance of the driver circuit 100C at the first and second output terminals 13 and 14 respectively and, on a reception side, with the resistors 121A and 122A respectively as well as with a high input-impedance reception circuit (not shown).

Since the differential output impedance of the driver circuit 100C between the first and second output terminals 13 and 14 is determined by a synthetic resistance value of a parallel connection of three kinds of resistors, which is expressed by resistance values RA, RB, and RSc, if it is assumed that the resistance of the resistors 3, 4, and 5 is RA, that of the resistor 7A is 2RSc, and that of the resistors 8 and 9 is RB, the transmission line 130 can be matched on both the transmission and reception sides by using the resistor 7A as an adjusting resistor in such a manner that the differential output impedance may be equal to the characteristic impedance of the transmission line 130 and also that the resistance RTc may be equal to the characteristic impedance of the transmission line 130.

Thus, in the driver circuit 100C of the present embodiment, the output impedance can remain constant regardless of whether the differential output is HIGH or LOW in level, so that an output amplitude to a transmission line 130 including a pair of coaxial cables can be set arbitrarily in a condition where an output impedance value is so held that the driver circuit 100C may be matched with the transmission line 130, and also an output signal offset value can be set at a value different from half of voltage of the power supply VDD, thus generating an output signal that matches circuit conditions of a reception circuit connected to the reception end of the transmission line 130. In the case of the present embodiment, inductive interference against an external device (especially, other transmission lines) can be reduced more because a pair of coaxial cables have been used as the transmission line 130.

The driver circuits 100A, 100B, and 100C according to any one of the first through third embodiments is not limited to a particular layout; for example, circuit elements may be arranged separately on a plurality of substrates or the plurality of resistors making up the driver circuits 100A, 100B, and 100C may each be a discrete element in contract to a semiconductor device made up of transistors or a like, in which cases, however, variation or a like which occur in a manufacturing process may give rise to an error in the constant value of the different elements at different ratios, so that fluctuations may occur in the operating state of the driver circuits 100A, 100B, and 100C thus changing an offset level for each of the products.

The following will describe an embodiment of a driver circuit which does not fluctuate in operating state, that is, does not change in offset level even with some variation in manufacturing process.

Fourth Embodiment

A driver circuit according to the present embodiment has the same circuit configuration as that of the first through third embodiments shown in FIGS. 1, 3, and 4 respectively except that MOS transistors and resistors of the driver circuit between first and second input terminals 11 and 12 and first and second output terminals 13 and 14 are all formed on the same substrate using the same manufacturing processes.

The variation, if any in the manufacturing process, have an influence on the resistance value of each of the resistors at a same ratio, so that an operating state, therefore, an offset level is not changed.

That is, in an equivalent circuit shown in FIG. 2. for example, even if the variation in manufacture cause various circuit elements a change of R1'=k1RA, R1'=k1'RA, R2=k2RB, and R2'=k2'RB respectively, these elements are arranged on the same substrate and manufactured using the same processes, so that these changes are relatively the same as each other, thus providing a relationship of k1=k1='k2= k2='k. In this case, an offset level VOS in Equation (4) is given as Equation (5):

$$VOS = \left(1 + \frac{kRA}{kRA + kRB}\right) \cdot \frac{V}{2} \quad (5)$$

$$= \left(1 + \frac{RA}{RA + RB}\right) \cdot \frac{V}{2}$$

As indicated by Equation (5), the offset level VOS depends on a ratio in magnitude between resistance values RA and RB. Therefore, even if there is variation in the resistance value of the elements owing to variation in manufacturing processes, the resistors have constant relative changes in resistance as far as they are on the same substrate, so that the offset level VOS is kept at a constant value.

As described above, with the configuration of the second embodiment, the output impedance stays at the same value irrespective of whether the differential output which occurs between the first and second output terminals is HIGH or LOW in level and, furthermore, an output amplitude to a transmission line can be set arbitrarily in a condition where an output impedance value is so held that the driver circuit may be matched with the transmission line and also an output signal offset level can be set at a value other than half of a power supply voltage, even at a constant value even with variation in manufacture.

It is apparent that the present invention is not limited to the above embodiments but may be changed and modified without departing from the scope and spirit of the invention. For example, in place of using PMOS and NMOS transistors of the driver circuit in the above-mentioned configuration of push-pull circuits, same types of transistors may be used in such a configuration that gates of a power supply-side transistor and a ground-side transistor of mutually different push-pull circuits are connected in parallel with each other so that in-phase data and opposite-phase data may be input respectively. Furthermore, in place of pull-up resistors 8 and 9 used in the third embodiment shown in FIG. 4, as in the case of the second embodiment pull-down resistors 8A and 9A can be used to set the offset level lower than half of voltage of the power supply VDD. Furthermore, in the fourth embodiment, the driver circuit manufactured by the same process need not necessarily be formed on the same substrate but may be formed on different substrates as far as the variation in manufacture are the same and also the use environments are the same.

What is claimed is:

1. A driver circuit for outputting to a transmission line a differential signal occurring between a first output terminal and a second output terminal as transmit data, comprising:
    a first circuit for outputting, when in-phase data is input to a first input terminal thereof, an output signal having a logic level which corresponds to said in-phase data to said first output terminal via resistors;
    a second circuit for outputting, when opposite-phase data is input to a second input terminal thereof, an output signal having a logic level which corresponds to said opposite-phase data to said second output terminal via resistors; and
    an adjusting resistor connected between said first output terminal and said second output terminal,
    wherein connected is a resistor between said first output terminal and a power supply or a ground, a resistor between said second output terminal and said power supply or said ground, so that an offset voltage of said differential signal can be set at a desired value.

2. The driver circuit according to claim 1, wherein each of said resistors is formed on a same substrate by using a same process.

3. A driver circuit comprising:
    a first circuit in which a first switching device that is turned ON when in-phase data is input thereto at a LOW level and a first resistor are connected in series with each other between a power supply and a first output terminal and also in which a second resistor and a second switching device that is turned ON when said in-phase data is input thereto at a HIGH level are connected in series with each other between said first output terminal and a ground;
    a second circuit in which a third switching device that is turned ON when opposite-phase data is input thereto at a LOW level and a third resistor are connected in series within each other between said power supply and a second output terminal and also in which a fourth resistor and a fourth switching device that is turned ON when said opposite-phase data is input thereto at a HIGH level are connected in series with each other between said second output terminal and said ground; and
    a fifth resistor connected between said first output terminal and said second output terminal, wherein:
        said first through fourth resistors have an equal resistance value;
        a sixth resistor is connected between said first output terminal and said power supply; and
        a seventh resistor is connected between said second output terminal and said power supply.

4. The driver circuit according to claim 3, wherein said sixth resistor and said seventh resistor have an equal resistance value.

5. The driver circuit according to claim 3, wherein a turn-ON resistance value of said first through fourth switching devices is negligible with respect to a resistance value of said first through fourth resistors respectively.

6. The driver circuit according to claim 3, wherein each of said switching devices is formed on a same substrate by using a same process.

7. A driver circuit comprising:
    a first circuit in which a first switching device that is turned ON when in-phase data is input thereto at a LOW level and a first resistor are connected in series with each other between a power supply and a first output terminal and also in which a second resistor and a second switching device that is turned ON when said in-phase data is input thereto at a HIGH level are connected in series with each other between said first output terminal and a ground;
    a second circuit in which a third switching device that is turned ON when opposite-phase data is input thereto at a LOW level and a third resistor are connected in series with each other between said power supply and a second output terminal and also in which a fourth resistor and a fourth switching device that is turned ON when said opposite-phase data is input thereto at a HIGH level are connected in series with each other between said second output terminal and said ground; and
    a fifth resistor connected between said first output terminal and said second output terminal, wherein:
        said first through fourth resistors have an equal resistance value;
        a sixth resistor is connected between said first output terminal and said ground; and
        a seventh resistor is connected between said second output terminal and said ground.

8. The driver circuit according to claim 7, wherein said sixth resistor and said seventh resistor have an equal resistance value.

9. The driver circuit according to claim 7, wherein a turn-ON resistance value of said first through fourth switching devices is negligible with respect to a resistance value of said first through fourth resistors respectively.

10. The driver circuit according to claim 7, wherein each of said switching devices is formed on a same substrate by using a same process.

11. A driver circuit comprising:
    a first circuit in which a first PMOS transistor that is turned ON when in-phase data is input thereto at a LOW level and a first resistor are connected in series with each other between a power supply and a first output terminal and also in which a second resistor and a first NMOS transistor that is turned ON when said in-phase data is input thereto at a HIGH level are connected in series with each other between said first output terminal and a ground;
    a second circuit in which a second PMOS transistor that is turned ON when opposite-phase data is input thereto at a LOW level and a third resistor are connected in series with each other between said power supply and a second output terminal and also in which a fourth resistor and a second NMOS transistor that is turned ON when said opposite-phase data is input thereto at a HIGH level are connected in series with each other between said second output terminal and said ground; and a fifth resistor connected between said first output terminal and said second output terminal, wherein:
  said first through fourth resistors have an equal resistance value;
  a sixth resistor is connected between said first output terminal and said power supply; and
  a seventh resistor is connected between said second output terminal and said power supply.

12. The driver circuit according to claim 11, wherein said sixth resistor and said seventh resistor have an equal resistance value.

13. The driver circuit according to claim 11, wherein a turn-ON resistance value of said first through fourth switching devices is negligible with respect to a resistance value of said first through fourth resistors respectively.

14. A driver circuit comprising:
  a first circuit in which a first PMOS transistor that is turned ON when in-phase data is input thereto at a LOW level and a first resistor are connected in series with each other between a power supply and a first output terminal and also in which a second resistor and a first NMOS transistor that is turned ON when said in-phase data is input thereto at a HIGH level are connected in series with each other between said first output terminal and a ground;

a second circuit in which a second PMOS transistor that is turned ON when opposite-phase data is input thereto at a LOW level and a third resistor are connected in series with each other between said power supply and a second output terminal and also in which a fourth resistor and a second NMOS transistor that is turned ON when said opposite-phase data is input thereto at a HIGH level are connected in series with each other between said second output terminal and said ground; and a fifth resistor connected between said first output terminal and said second output terminal, wherein:
    said first through fourth resistors have an equal resistance value;
    a sixth resistor is connected between said first output terminal and said ground; and
    a seventh resistor is connected between said second output terminal and said ground.

15. The driver circuit according to claim 14, wherein said sixth resistor and said seventh resistor have an equal resistance value.

16. The driver circuit according to claim 14, wherein a turn-ON resistance value of said first through fourth switching devices is negligible with respect to a resistance value of said first through fourth resistors respectively.

* * * * *